(12) United States Patent
Kashimoto

(10) Patent No.: US 9,538,043 B2
(45) Date of Patent: Jan. 3, 2017

(54) IMAGE FORMING SYSTEM THAT PREVENTS INCREASING OF DATA AMOUNT OF PRINT DATA AND REDUCING OF PRINTING RESULT QUALITY, IMAGE FORMING APPARATUS, AND RECORDING MEDIUM

(71) Applicant: KYOCERA Document Solutions Inc., Osaka (JP)

(72) Inventor: Yosuke Kashimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/939,480

(22) Filed: Nov. 12, 2015

(65) Prior Publication Data

US 2016/0142583 A1    May 19, 2016

(30) Foreign Application Priority Data

Nov. 17, 2014  (JP) ................................ 2014-232409

(51) Int. Cl.
<table>
<tr><td>H04N 1/40</td><td>(2006.01)</td></tr>
<tr><td>G06F 3/12</td><td>(2006.01)</td></tr>
<tr><td>H04N 1/58</td><td>(2006.01)</td></tr>
<tr><td>G06K 15/02</td><td>(2006.01)</td></tr>
<tr><td>G06T 11/60</td><td>(2006.01)</td></tr>
</table>

(52) U.S. Cl.
CPC ........ *H04N 1/40068* (2013.01); *G06F 3/1208* (2013.01); *G06F 3/1244* (2013.01); *G06F 3/1286* (2013.01); *G06K 15/1849* (2013.01); *G06K 15/1874* (2013.01); *G06T 11/60* (2013.01); *H04N 1/58* (2013.01); *G06K 15/1852* (2013.01); *H04N 2201/0094* (2013.01)

(58) Field of Classification Search
None
See application file for complete search history.

(56) References Cited

U.S. PATENT DOCUMENTS 6,590,675 B1 *  7/2003  Tomiyasu ............... G06K 15/02
                                                        358/1.18
9,070,319 B1 *  6/2015  Soni ......................... G09G 5/14
(Continued)

FOREIGN PATENT DOCUMENTS

JP        H 10-40029 A        2/1998

*Primary Examiner* — Ming Hon
(74) *Attorney, Agent, or Firm* — Stein IP, LLC

(57) ABSTRACT

An image forming system includes a computer and an image forming apparatus. The computer includes a print data generating circuit to generate print data of an image. The image forming apparatus includes a rendering circuit to execute rendering of the image based on the print data. The computer includes an image generating circuit generates an image object to indicate a state where the objects are overlapped in the image with a reduced resolution at least partially. The print data generating circuit generates the print data including the at least one object included in the image and the image object generated by the image generating circuit. When the rendering circuit processes the image object, the rendering circuit enhances the resolution of a part corresponding to the object in the image object based on a shape of the object overlapped at upper side in the image object.

6 Claims, 13 Drawing Sheets

(56) References Cited

U.S. PATENT DOCUMENTS

| | | | |
|---|---|---|---|
| 2003/0107773 A1* | 6/2003 | Takamine | H04N 1/00291 358/296 |
| 2006/0045357 A1* | 3/2006 | Schwartz | G06T 7/0081 382/232 |
| 2011/0242601 A1* | 10/2011 | Takahashi | G06F 3/1205 358/1.15 |
| 2012/0045095 A1* | 2/2012 | Tate | G06T 5/003 382/103 |
| 2013/0063736 A1* | 3/2013 | Chiba | G06T 11/60 358/1.6 |
| 2014/0085681 A1* | 3/2014 | Jung | H04N 1/3871 358/3.01 |

\* cited by examiner

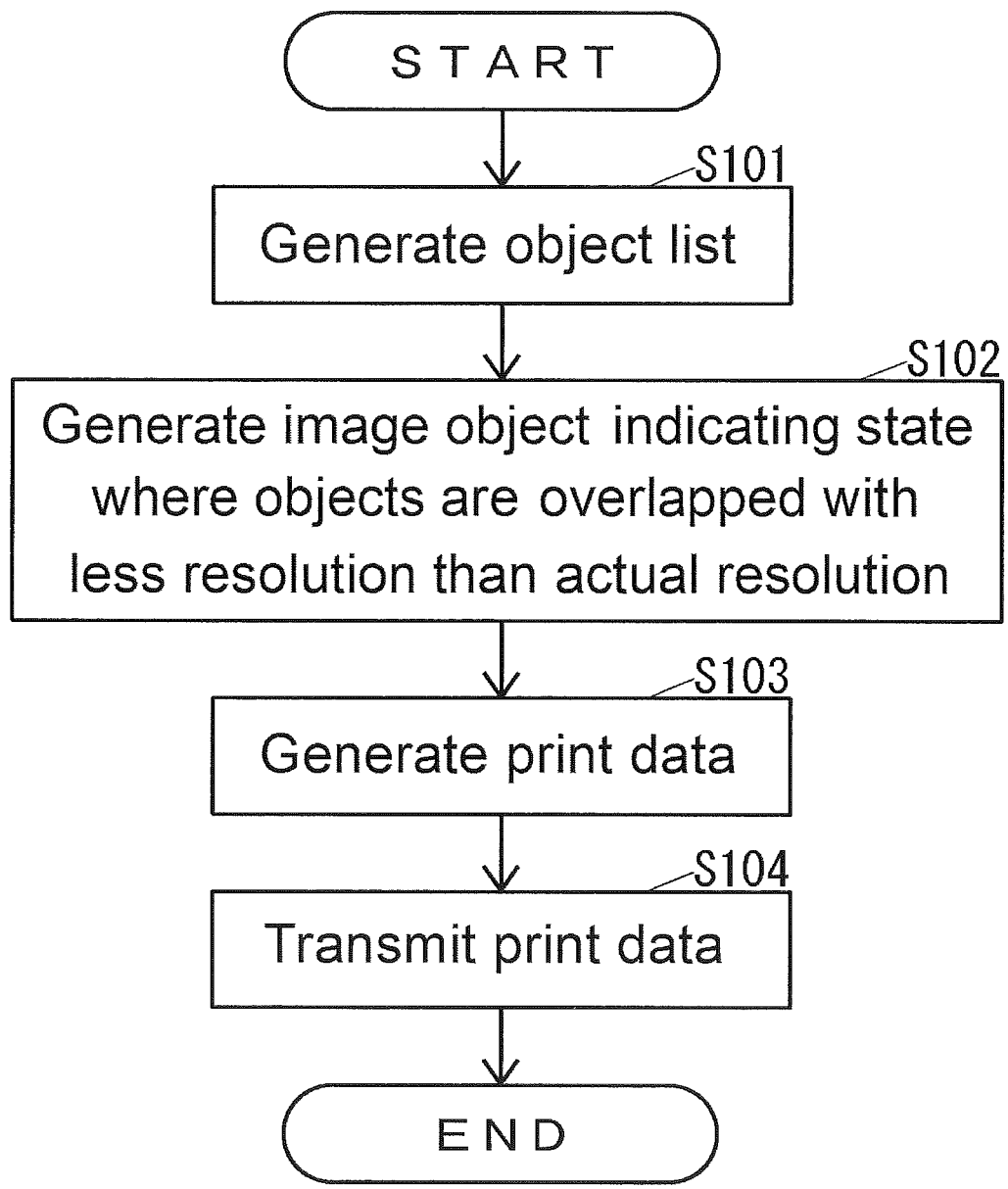

FIG. 5

| No. | ID | Coordinate | Attribution | Transparency Setting | Overlapping Target | Overlapping Condition |
|---|---|---|---|---|---|---|
| 1 | A | $(X_a, Y_a), (X_a', Y_a')$ | Vector | None | C | Partial |
| 2 | B | $(X_b, Y_b), (X_b', Y_b')$ | Vector | None | C | Fill |
| 3 | C | $(X_c, Y_c), (X_c', Y_c')$ | Raster | None | D | Enclosed |
| | | | | | E | Partial |
| | | | | | F | Enclosed |
| | | | | | H | Partial |
| 4 | D | $(X_d, Y_d), (X_d', Y_d')$ | Vector | None | None | |
| 5 | E | $(X_e, Y_e), (X_e', Y_e')$ | Vector | Transparent | F | Partial |
| | | | | | G | Partial |
| 6 | F | $(X_f, Y_f), (X_f', Y_f')$ | Text | Transparent | None | |
| 7 | G | $(X_g, Y_g), (X_g', Y_g')$ | Text | Transparent | None | |
| 8 | H | $(X_h, Y_h), (X_h', Y_h')$ | Text | Transparent | None | |

40

FIG. 8
| No. | ID | Coordinate | Attribution | Overlapping Information | Object Image |
|---|---|---|---|---|---|
| 1 | A | $(X_a, Y_a)$, $(X_a', Y_a')$ | Vector | |  |
| 2 | E | $(X_e, Y_e)$, $(X_e', Y_e')$ | Vector | |  |
| 3 | G | $(X_g, Y_g)$, $(X_g', Y_g')$ | Text | | V |
| 4 | I | $(X_i, Y_i)$, $(X_i', Y_i')$ | Image | E$(X_e, Y_e)$, $(X_e', Y_e')$ G$(X_g, Y_g)$, $(X_g', Y_g')$ |  |
| 5 | H | $(X_h, Y_h)$, $(X_h', Y_h')$ | Text | | A |
| 6 | J | $(X_j, Y_j)$, $(X_j', Y_j')$ | Image | E$(X_e, Y_e)$, $(X_e', Y_e')$ H$(X_h, Y_h)$, $(X_h', Y_h')$ |  |
| 7 | D | $(X_d, Y_d)$, $(X_d', Y_d')$ | Vector | |  |

FIG. 13
| No. | ID | Coordinate | Attribution | Overlapping Information | Object Image |
|---|---|---|---|---|---|
| 1 | A | $(X_a, Y_a)$, $(X_a', Y_a')$ | Vector | |  |
| 2 | E | $(X_e, Y_e)$, $(X_e', Y_e')$ | Vector | | 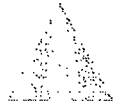 |
| 3 | G | $(X_g, Y_g)$, $(X_g', Y_g')$ | Text | | V |
| 4 | I | $(X_i, Y_i)$, $(X_i', Y_i')$ | Image | $E(X_e, Y_e), (X_e', Y_e')$ $G(X_g, Y_g), (X_g', Y_g')$ | V |
| 5 | F | $(X_f, Y_f)$, $(X_f', Y_f')$ | Text | | X |
| 6 | H | $(X_h, Y_h)$, $(X_h', Y_h')$ | Text | | A |
| 7 | J | $(X_j, Y_j)$, $(X_j', Y_j')$ | Image | $E(X_e, Y_e), (X_e', Y_e')$ $F(X_f, Y_f), (X_f', Y_f')$ $H(X_h, Y_h), (X_h', Y_h')$ |  |
| 8 | D | $(X_d, Y_d)$, $(X_d', Y_d')$ | Vector | |  |

IMAGE FORMING SYSTEM THAT PREVENTS INCREASING OF DATA AMOUNT OF PRINT DATA AND REDUCING OF PRINTING RESULT QUALITY, IMAGE FORMING APPARATUS, AND RECORDING MEDIUM

INCORPORATION BY REFERENCE

This application is based upon, and claims the benefit of priority from, corresponding Japanese Patent Application No. 2014-232409 filed in the Japan Patent Office on Nov. 17, 2014, the entire contents of which are incorporated herein by reference.

BACKGROUND

Unless otherwise indicated herein, the description in this section is not prior art to the claims in this application and is not admitted to be prior art by inclusion in this section.

As an image forming system that can print an image constituted of a plurality of objects, an image forming system including a computer, which generates print data of the image, and an image forming apparatus, which executes rendering of the image based on the print data to print the image, has been known. The computer of such image forming system generates an image object indicating a state where objects are overlapping in the image and transmits at least one object included in the image and the generated image object to the image forming apparatus.

SUMMARY

An image forming system according to one aspect of the disclosure prints an image including a plurality of objects. At least a part of the objects overlaps one another. The image forming system includes a computer and an image forming apparatus. The computer includes a print data generating circuit to generate print data of the image. The image forming apparatus includes a rendering circuit to execute rendering of the image based on the print data to print the image. The computer includes an image generating circuit generates an image object to indicate a state where the objects are overlapped in the image with a reduced resolution at least partially compared with an actual resolution of the image. The print data generating circuit generates the print data including the at least one object included in the image and the image object generated by the image generating circuit. When the rendering circuit processes the image object, the rendering circuit enhances the resolution of a part corresponding to the object in the image object based on a shape of the object overlapped at upper side in the image object.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4 is a flowchart of an operation of the computer according to the one embodiment when the computer transmits print data;

FIG. 5 is a tabular diagram illustrating an exemplary object list generated by the computer;

FIG. 8 is a tabular diagram illustrating contents of exemplary print data generated based on the image;

FIG. 13 is a tabular diagram illustrating exemplary print data generated based on the image illustrated in FIG. 6, but contents of an example different from the example illustrated in FIG. 8.

DETAILED DESCRIPTION

Figure 1:
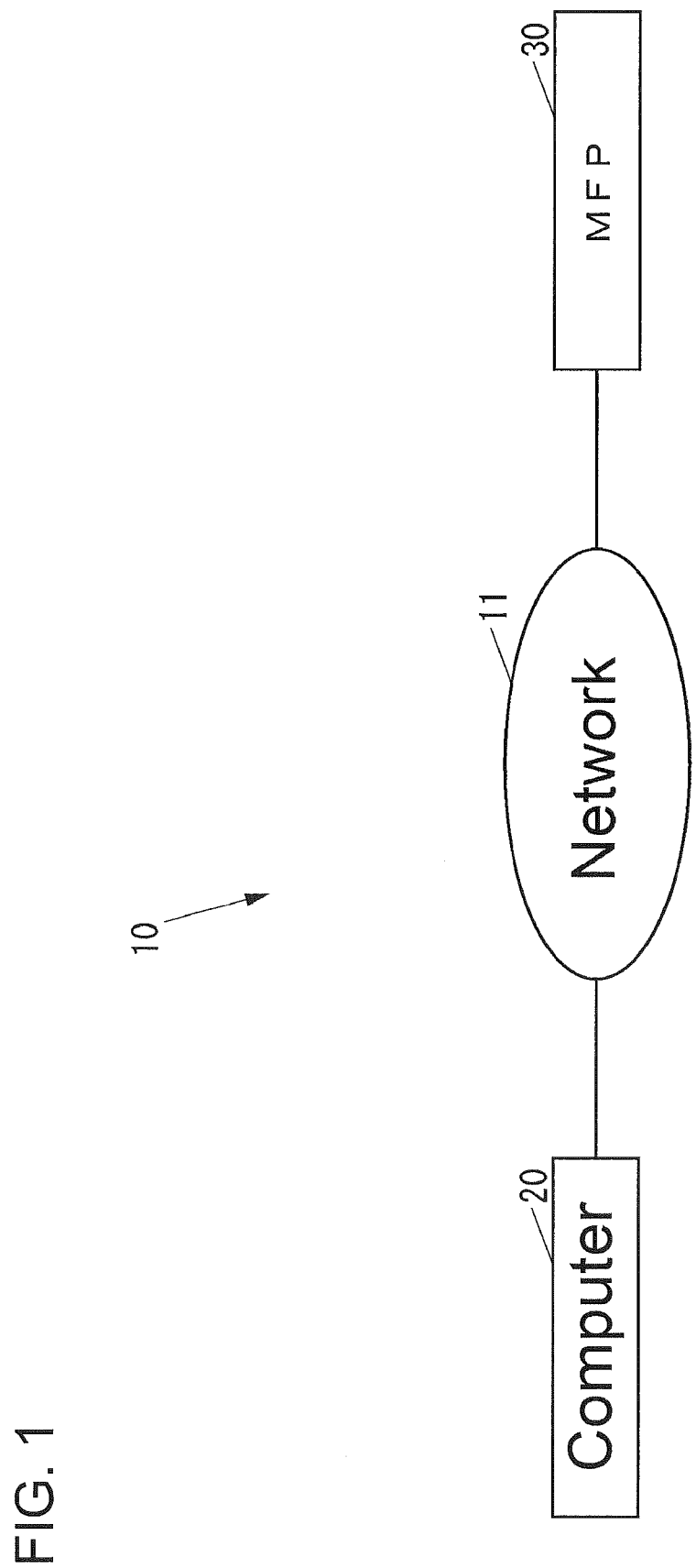
FIG. 1 is a schematic diagram illustrating an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure by referring to the drawings.

First, a description will be given of the configuration of an image forming system according to the embodiment FIG. 1 illustrates an image forming system 10 according to the one embodiment.

As illustrated in FIG. 1, the image forming system 10 includes a computer 20, which generates the print data of an image, and a Multifunction Peripheral (MFP) 30, which is as an image forming apparatus for printing the image based on the print data. The computer 20 and the MFP 30 are communicatively connected to each other via a network 11, such as a Local Area Network (LAN) or the Internet.

Figure 2:
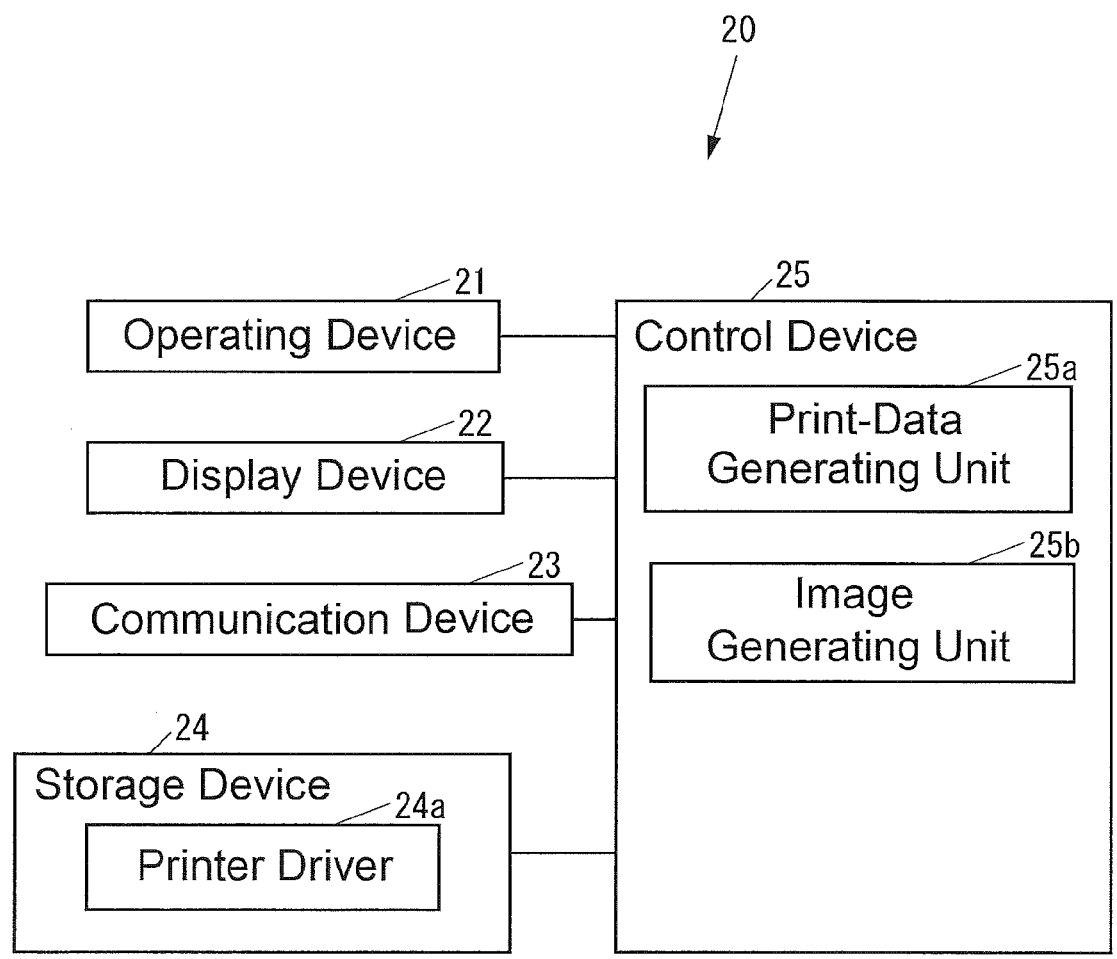
FIG. 2 is a schematic diagram illustrating a block configuration of a computer included in the image forming system.

FIG. 2 illustrates the computer 20.

As illustrated in FIG. 2, the computer 20 includes an operating device 21, a display device 22, a communication device 23, a storage device 24, and a control device 25. The operating device 21 is an input device such as a computer mouse and a keyboard for receiving various kinds of operations. The display device 22 is a display device such as a Liquid Crystal Display (LCD) that displays various pieces of information. The communication device 23 is a communication device that communicates with an external device such as the MFP 30 (see FIG. 1) via the network 11 (see FIG. 1). The storage device 24 is a storage device such as a Hard Disk Drive (HDD) that stores programs and various kinds of data. The control device 25 controls the entire computer 20. The computer 20 is constituted of an electronic device, for example, a Personal Computer (PC) or a mobile device.

The storage device 24 stores a printer driver 24a to control the MFP 30. The printer driver 24a may be installed to the computer 20 at production stage of the computer 20, may be additionally installed from a storage medium such as a Compact Disk (CD), a Digital Versatile Disk (DVD), and a Universal Serial Bus (USB) memory to the computer 20, or may be additionally installed from the network 11 to the computer 20

The control device 25 includes, for example, a Central Processing Unit (CPU), a Read Only Memory (ROM), which preliminary stores programs and various kinds of data, and a Random Access Memory (RAM), which is used as a work area of the CPU. The CPU executes the program stored in the ROM or the storage device 24.

The control device 25 executes the printer driver 24a stored in the storage device 24. This ensures the control device 25 to function as a print-data generating unit 25a, which generates the print data of the image, and an image generating unit 25b, which generates an image object indicating a state where objects are overlapped in the image. The print-data generating unit 25a and the image generating unit 25b are also respectively referred to as a print data generating circuit and an image generating unit circuit.

Figure 3:
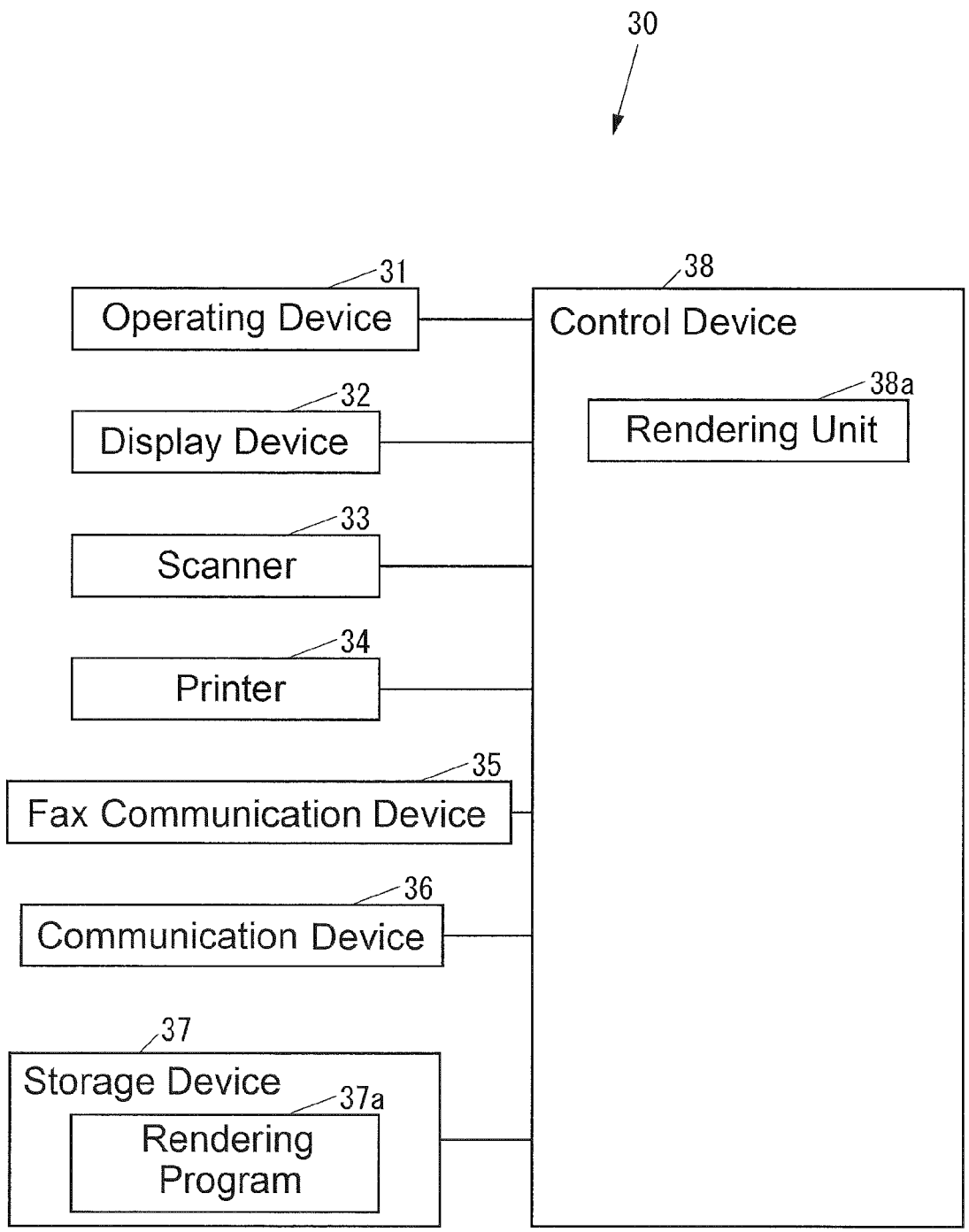
FIG. 3 is a schematic diagram illustrating a block configuration of an MFP included in the image forming system.

FIG. 3 illustrates the MFP 30.

As illustrated in FIG. 3, the MFP 30 includes an operating device 31, a display device 32, a scanner 33, a printer 34, a fax communication device 35, a communication device 36, a storage device 37, and a control device 38. The operating device 31 is an input device such as a button for receiving various kinds of operations. The display device 32 is a display device such as a LCD that displays various information. The scanner 33 is a reading device that reads data from an original document. The printer 34 is a print device that performs a print job on a recording medium such as a paper sheet. The fax communication device 35 is a fax device that performs fax communication with an external facsimile device (not illustrated) via a communication line such as a dial-up line. The communication device 36 is a communication device that communicates with an external device such as the computer 20 (see FIG. 1) via the network 11 (see FIG. 1). The storage device 37 is a storage device such as an Electrically Erasable Programmable Read Only Memory (EEPROM) and a Hard Disk Drive (HDD) that store various kinds of data. The control device 38 controls the entire MFP 30.

The storage device 37 stores a rendering program 37a for executing image rendering based on the print data. The rendering program 37a may be installed to the MFP 30 at production stage of the MFP 30, may be additionally installed from a storage medium such as an SD card and a USB flash drive to the MFP 30, or may be additionally installed from the network 11 to the MFP 30.

The control device 38 includes, for example, a CPU, a ROM, which stores programs and various kinds of data, and a RAM, which is used as a work area of the CPU. The CPU executes the program stored in the ROM or the storage device 37.

The control device 38 executes the rendering program 37a stored in the storage device 37. This ensures the control device 38 to function as a rendering unit 38a that executes image rendering based on the print data. The rendering unit 38a is also referred to as a rendering circuit.

Next, a description will be given of the operation of the image forming system 10.

First, the operation of the computer 20 when the computer 20 transmits the print data will be described.

FIG. 4 illustrates the operation of the computer 20 when the computer 20 transmits the print data.

The control device 25 of the computer 20 executes the printer driver 24a to perform the operation illustrated in FIG. 4.

As illustrated in FIG. 4, the control device 25 generates an object list 40 (see FIG. 5) indicating a list of objects that constitute the image (Step S101).

FIG. 5 illustrates an exemplary object list 40 generated by the computer 20.

The object list 40 illustrated in FIG. 5 includes an "ID" as identification information of the target object, a "coordinate" indicating which position in the image the target object is arranged, an "attribution" of the target object, a "transparency setting" indicating whether or not the target object has transparency, an "overlapping target" indicating another object overlapping the target object, and an "overlapping condition" indicating how the object indicated in the "overlapping target" overlaps the target object. The object list 40 includes these items by each object.

The "coordinate" is indicated, for example, as a combination of an upper left coordinate and a lower right coordinate in a smallest rectangular surrounding the target object in the image.

The "attribution" includes, for example, a vector object, a raster object, and a text object.

The "overlapping condition" includes, for example, a "partial" indicating that only a part of the object indicated in the "overlapping target" overlaps the target object, a "fill" indicating that the object indicated in the "overlapping target" overlaps the whole target object, and an "enclosed" indicating that the whole object indicated in the "overlapping target" overlaps the target object.

The lower the object is indicated in the column of the object list 40, the upper the object is arranged in the layer of the image.

Figure 6:
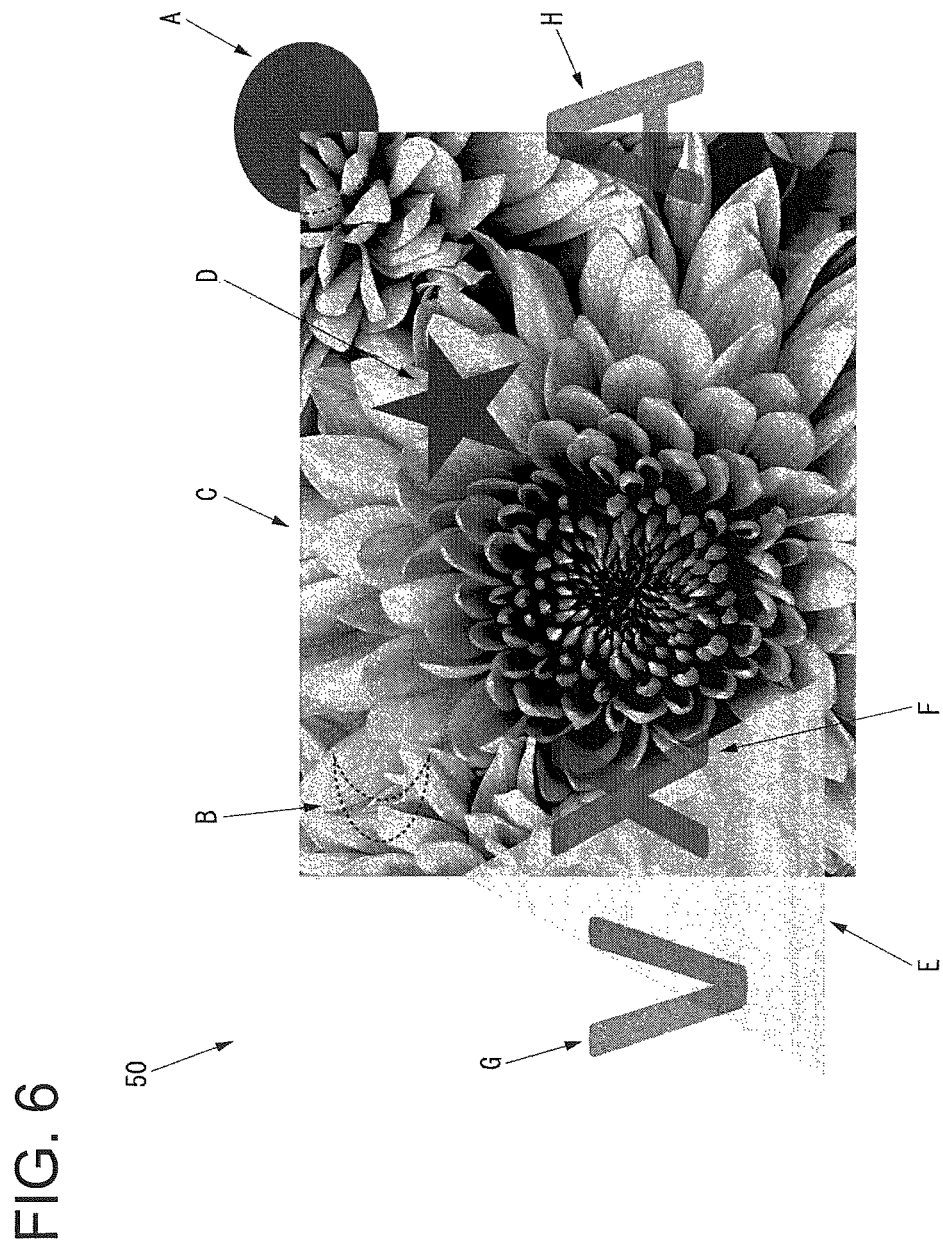
FIG. 6 is a schematic diagram illustrating an image on which the object list is based.

FIG. 6 illustrates an image 50 on which the object list 40 illustrated in FIG. 5 is based.

As illustrated in FIGS. 5 and 6, an object with ID "A" (hereinafter referred to as "object A." The same applies to the B to H.) is a vector object in an elliptical shape without transparency. On the object A, only a part of an object C without transparency is overlapping. While a part of the object A is drawn by a dashed line in FIG. 6 for easy understanding, the part does not appear actually in the image 50.

An object B is a vector object in a crescent shape without transparency. On the object B, the object C without transparency is overlapping the whole object B. While the object B is drawn by a dashed line in FIG. 6 for easy understanding, the object B is an object that does not appear actually in the image 50.

The object C is a raster object with a flower pattern in a rectangular shape without transparency. On the object C, a whole object D without transparency, only a part of an object E with transparency, a whole object F with transparency, and only a part of an object H with transparency are overlapping.

The object D is a vector object in a star shape without transparency. On the object D, no other objects are overlapped.

The object E is a vector object in a triangular shape with transparency. On the object E, only a part of the object F with transparency and only a part of an object G with transparency are overlapping.

The object F is a text object of a character "X" with transparency. On the object F, no other objects are overlapped.

The object G is a text object of a character "V" with transparency. On the object G, no other objects are overlapped.

The object H is a text object of a character "A" with transparency. On the object H, no other objects are overlapped.

As illustrated in FIG. 4, after the process of Step S101, the image generating unit 25b of the computer 20 generates the image object that indicates a state of objects overlapping in the image 50 based on the "attribution", the "transparency setting", the "overlapping target", and the "overlapping condition", which are included in the object list 40 generated at Step S101, and a specific rule (Step S102). The image generating unit 25b generates the image object with making the resolution of at least a part of the image object lower than the actual resolution of the image 50. For example, the image generating unit 25b may generate only the image object that includes a state where the objects are overlapped with transparency in the image 50. When the image generating unit 25b generates the image object, the image generating unit 25b generates overlapping information that indicates which object the target image object overlaps, and adds the overlapping information to the target image object. The image generating unit 25b generates the image object as necessary. Then, the process of Step S102 is omitted if it is not necessary.

Figure 7A:
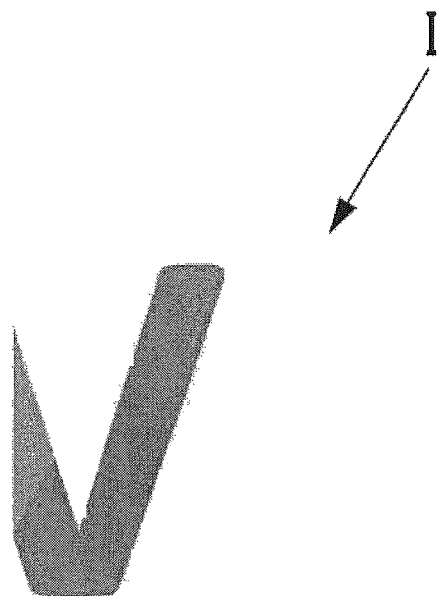
FIG. 7A is a schematic diagram illustrating an exemplary image object generated by the computer.
Figure 7B:
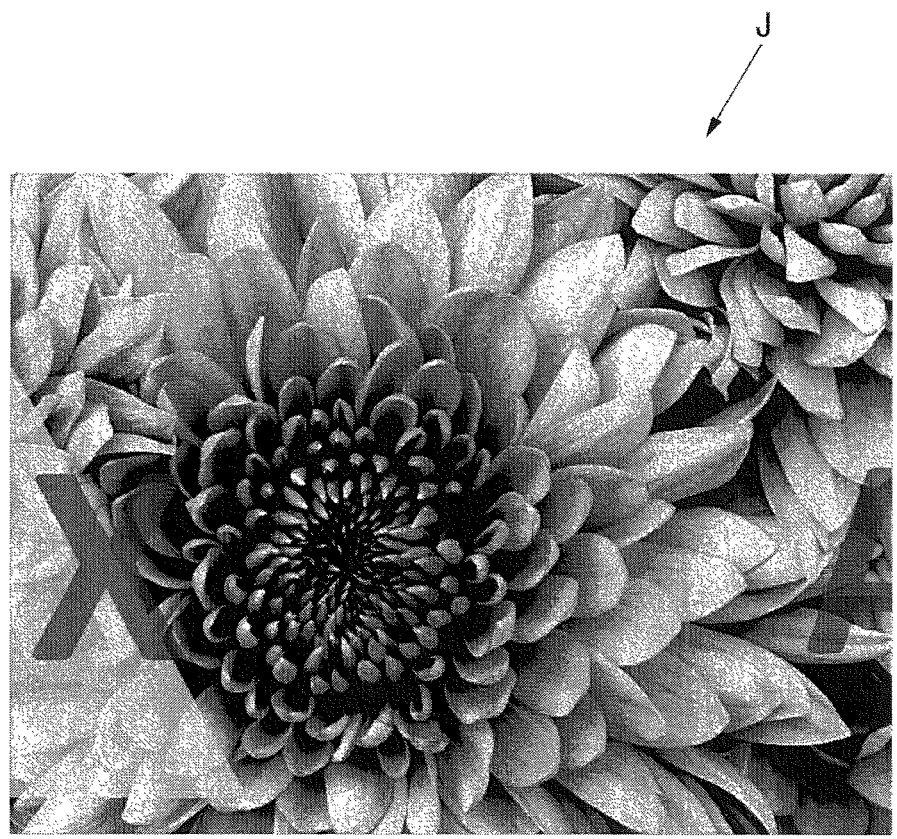
FIG. 7B is a schematic diagram illustrating an exemplary image object generated by the computer, but different from the example illustrated in FIG. 7A.

For example, at the process of Step S102, the image generating unit 25b generates an object I illustrated in FIG. 7A and an object J illustrated in FIG. 7B as the image object with respect to the image 50 illustrated in FIG. 6.

The object I illustrated in FIG. 7A is the image object indicating a state where the object G is overlapping the object E in the image 50.

The object J illustrated in FIG. 7B is the image object indicating a state where the object E, the object F, and the object H are overlapping the object C in the image 50.

As illustrated in FIG. 4, after the process of Step S102, the print-data generating unit 25a of the computer 20 generates print data 60 of Page Description Language (PDL) illustrated in FIG. 8 (Step S103).

FIG. 8 illustrates contents of exemplary print data 60 generated based on the image 50 illustrated in FIG. 6.

In the print data 60 illustrated in FIG. 8, an order of overlapping of the objects is changed because the MFP 30 can perform a overwrite processing of the object to generate the image. That is, when the MFP 30 generates the image, the lower the object is listed in FIG. 8, the upper layer the object is arranged. In the print data 60, the "transparency setting" in the image 50 is deleted.

As illustrated in FIG. 4, the control device 25 of the computer 20 transmits the print data generated at Step S103 to the MFP 30 via the communication device 23 (Step S104). Then, the control device 25 terminates the operation illustrated in FIG. 4.

Next, a description will be given of the operation of the MFP 30 when the MFP 30 receives the print data to execute the print job.

Figure 9:
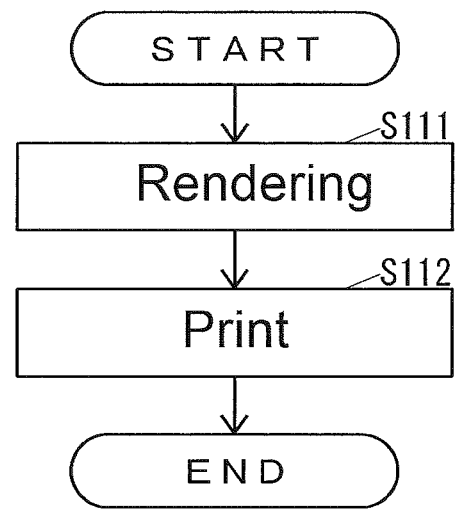
FIG. 9 is a flowchart of an operation of the MFP when the MFP receives the print data to execute a print job.

FIG. 9 illustrates the operation of the MFP 30 when the MFP 30 receives the print data to execute the print job.

When the control device 38 of the MFP 30 receives the print data via the communication device 36, the control device 38 executes the rendering program 37a to perform the operation illustrated in FIG. 9.

As illustrated in FIG. 9, the rendering unit 38a of the control device 38 interprets the print data received via the communication device 36 to execute rendering (Step S111). Here, when the rendering unit 38a processes the image objects, the rendering unit 38a enhances the resolution of a part corresponding to the object in the image object based on the shape of the object overlapped at upper side in the image object, which is indicated by the overlapping information.

For example, a description will be given of a state where the computer 20 generates print data 80 illustrated in FIG. 11 based on an image 70 illustrated in FIG. 10A.

Figure 10A:
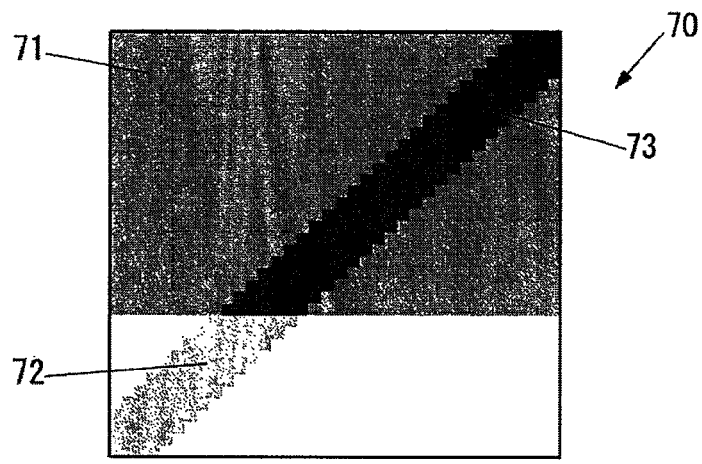
FIG. 10A is a schematic diagram illustrating an exemplary image based on which print data is generated by the computer.
Figure 10B:
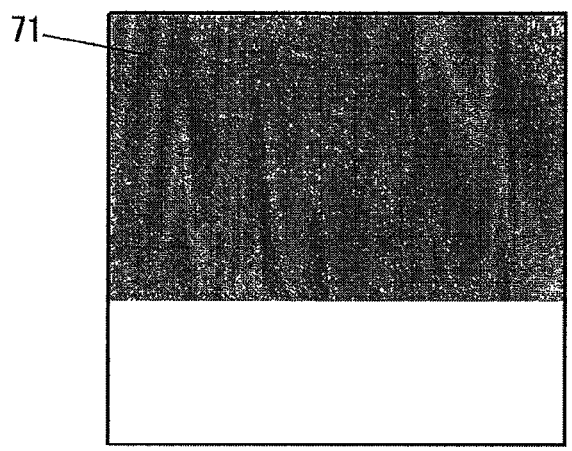
FIG. 10B is a schematic diagram illustrating a raster object among the images illustrated in FIG. 10A.
Figure 10C:
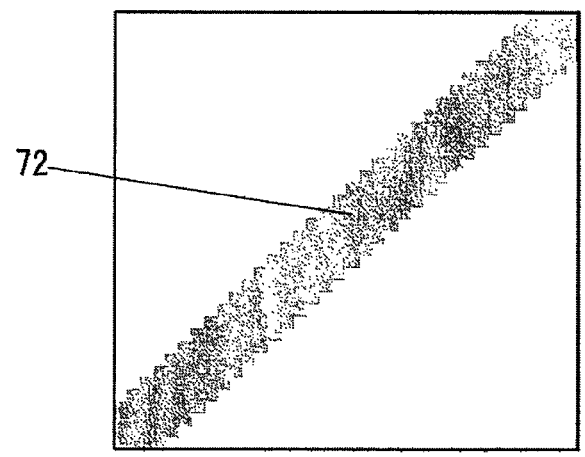
FIG. 10C is a schematic diagram illustrating a vector object among the images illustrated in FIG. 10A.

The image 70 illustrated in FIG. 10A is the image showing a vector object 72 with transparency illustrated in FIG. 100 overlapping a raster object 71 illustrated in FIG. 10B. A region 73 illustrated in FIG. 10A is a region where the vector object 72 is overlapping the raster object 71 in the image 70.

Figure 11:
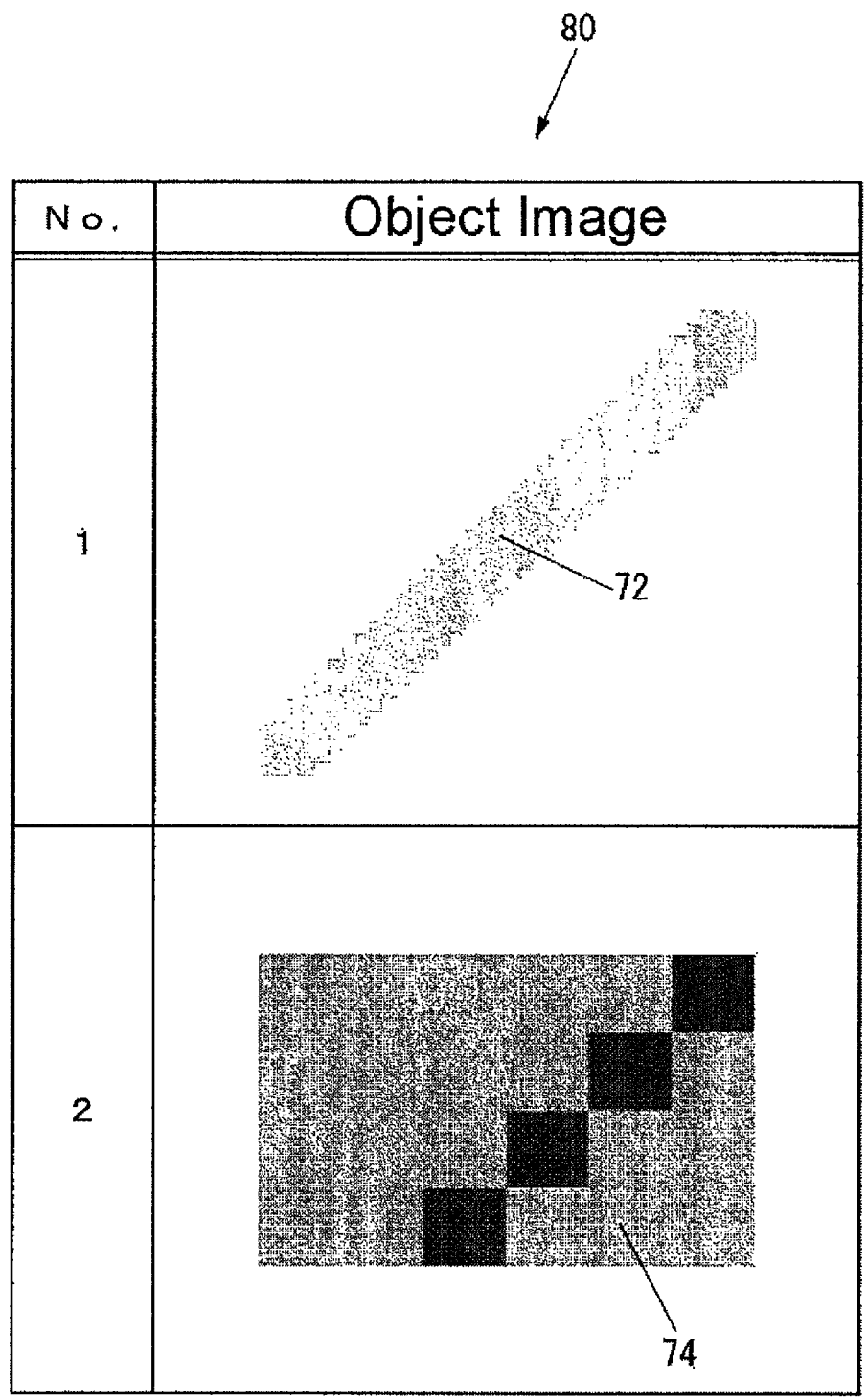
FIG. 11 is a schematic diagram illustrating contents of exemplary print data generated based on the image illustrated in FIG. 10A.

An image object 74 of the print data 80 illustrated in FIG. 11 indicates a state where the vector object 72 is overlapping the raster object 71 in the image 70 (see FIG. 10A). The image object 74 is a raster object generated in a state where the resolution of a part that the vector object 72 is overlapping the raster object 71 is made lower than the actual resolution of the image 70. The print data 80 indicates that the image object 74 overlaps the vector object 72. In FIG. 11, the ID, the coordinate, the attribution, and the overlapping information are omitted.

Figure 12A:
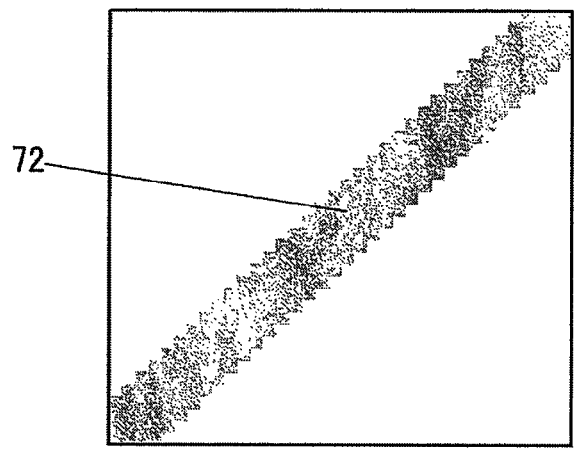
FIG. 12A is a schematic diagram illustrating a state of a process when the image is generated based on the print data illustrated in FIG. 11.

First, as illustrated in FIG. 12A, the rendering unit 38a draws the vector object 72 based on the print data 80.

Figure 12B:
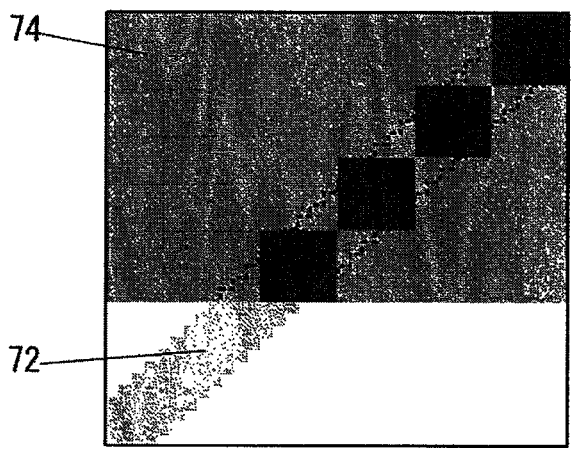
FIG. 12B is a schematic diagram illustrating a state of a process after the process illustrated in FIG. 12A.

Next, as illustrated in FIG. 12B, the rendering unit 38a draws the image object 74 on the vector object 72 based on the print data 80. In FIG. 12B, while a part hidden under the image object 74 of the vector object 72 is drawn by a dashed line for easy understanding, the dashed line part does not appear actually.

Figure 12C:
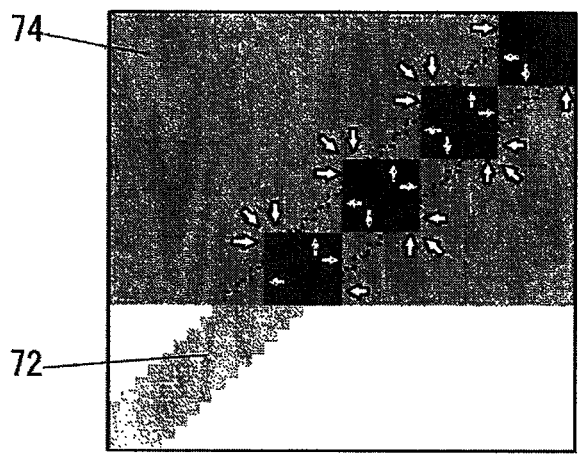
FIG. 12C is a schematic diagram illustrating a state of a process after the process illustrated in FIG. 12B.

Lastly, the rendering unit 38a performs a complementing process to the part corresponding to the vector object 72 in the image object 74 from the peripheral area as illustrated by arrow heads in FIG. 12C based on the shape of the vector object 72 indicated on which the image object 74 overlaps by the overlapping information of the print data 80 to enhance the resolution of the part. Accordingly, the rendering unit 38a can generate an image equal to the image 70 illustrated in FIG. 10A.

Various conditions in the complementing process such as a degree to change a color in the complementing process depend on settings.

As illustrated in FIG. 9, after the process of Step S111, the control device 38 prints the image generated at the process of Step S111 by the printer 34 (Step S112). Then, the control device 38 terminates the processes illustrated in FIG. 9.

As described above, the image forming system 10 generates the image object that is included in the print data in a state where the resolution of at least a part of the image object is made lower than the actual resolution of the image (Step S102). This ensures the image forming system 10 to reduce increasing of the data amount of the print data.

When the image forming system 10 executes image rendering based on the print data (Step S111), in processing the image object, the image forming system 10 enhances the resolution of the part corresponding to the object in the image object based on the shape of the object overlapped at upper side in the image object. This ensures the image forming system 10 to reduce a deterioration of the printing result quality.

In the image forming system 10, the MFP 30 is not necessary to determine which image object overlaps which object based on the image object and the object in the print data because the print data includes the overlapping information. Accordingly, the image forming system 10 can reduce the processing time of the print data in the MFP 30.

Insofar as the image forming system 10 has a configuration that the MFP 30 determines which image object overlaps which object based on the image object and the object in the print data, the print data is not necessary to include the overlapping information.

The image forming system 10 generates only the image object including a state where the objects are overlapped with transparency in the image. This ensures the image forming system 10 to reduce a count of the image object included in the print data. Accordingly, the image forming system 10 can reduce the increasing of the data amount of the print data.

With respect to the image object to be generated in a condition where the objects are overlapped in the image, the image forming system 10 may employ a condition other than the condition to generate only the image object including a state where the objects are overlapped with transparency in the image.

As the object B in the image 50 is not included in the print data 60, the image forming system 10 includes only the object actually appearing in the image in the print data. This ensures the image forming system 10 to reduce a count of the object included in the print data. Accordingly, the image forming system 10 can reduce the increasing of the data amount of the print data. The object not appearing actually in the image does not appear even in the printing result. Then, even if the object is not included in the print data, the printing result quality is not deteriorated.

As the object F in the image 50 is not included in the print data 60, the image forming system 10 does not include the object that is included in the image object as a whole in the print data. This ensures the image forming system 10 to reduce the count of the object to include in the print data. Accordingly, the image forming system 10 can reduce the increasing of the data amount of the print data. The resolution of the object included in the image object as a whole is overall identical even if the resolution of the corresponding part in the image object is not enhanced. Then, the image forming system 10 can reduce the uncomfortable feeling in the printing result.

As illustrated in FIG. 13, the image forming system 10 may include the object F included in the image object J as a whole in the print data.

While the image forming apparatus of the disclosure is an MFP in the embodiment, insofar as the device that prints the image based on the print data, the image forming apparatus other than the MFP such as a printer-only machine may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system for printing an image including a plurality of objects, a part of the objects overlapping one another, the image forming system comprising:
   a computer that includes a print data generating circuit to generate print data of the image; and
   an image forming apparatus that includes a rendering circuit to execute rendering of the image based on the print data to print the image,
   wherein:
   the computer generates an object list indicating a list of the object that constitutes the image;
   the object list includes i) identification information of the object, ii) a "coordinate" indicating which position in the image the object is arranged, iii) an "attribution" of the object including a vector object, a raster object, and a text object, iv) a "transparency setting" indicating whether or not the object has transparency, v) an "overlapping target" indicating another object overlapping the object, and vi) an "overlapping condition" including a "partial", a "fill", and an "enclosed", and indicating how the other object indicated in the "overlapping target" overlaps the object;
   the computer further includes an image generating circuit that generates an image object to indicate a state where the objects are overlapped in the image based on the "attribution", the "transparency setting", the "overlapping target", and the "overlapping condition" included in the object list, with a reduced resolution at least partially compared with an actual resolution of the image;
   the print data generating circuit generates the print data including the at least one object included in the image, the image object generated by the image generating circuit, and overlapping information; and
   when processing the image object, the rendering circuit enhances the resolution of a part corresponding to the object in the image object based on a shape of the object indicated by the overlapping information, and
   wherein:
   if a specified image object of the print data indicates a state where a specified vector object is overlapping a specified raster object in the image, the specified image object is a raster object generated in a state where the resolution of a part that the specified vector object is overlapping the specified raster object is made lower than the actual resolution of the image, and the print data indicates that the specified image object overlaps the specified vector object; and
   the rendering circuit i) draws the specified vector object based on the print data, ii) draws the specified image object on the specified vector object based on the print data, and iii) performs a complementing process to the part corresponding to the specified vector object in the specified image object from a peripheral area based on the shape of the specified vector object indicated on which the specified image object overlaps by the overlapping information of the print data to enhance the resolution of the part.

2. The image forming system according to claim 1, wherein the image generating circuit generates only the image object in a state where the object with transparency overlaps in the image.

3. The image forming system according to claim 1, wherein the print data generating circuit excludes the object that is included in the image object as a whole in the print data.

4. The image forming system according to claim 1, wherein the print data generating circuit include only the object actually appearing in the image in the print data.

5. An image forming apparatus for printing an image including a rendering circuit for executing rendering of the image based on print data of the image constituted of a plurality of objects, a part of the objects overlapping one another, wherein:
the print data includes
at least one object included in the image,
an image object that indicates a state where the objects are overlapped in the image, and overlapping information, the image object having a reduced resolution at least partially compared with an actual resolution of the image, and
when processing the image object, the rendering circuit enhances the resolution of a part corresponding to the object in the image object based on a shape of the object, and wherein:
if a specified image object of the print data indicates a state where a specified vector object is overlapping a specified raster object in the image, the specified image object is a raster object generated in a state where the resolution of a part that the specified vector object is overlapping the specified raster object is made lower than the actual resolution of the image, and the print data indicates that the specified image object overlaps the specified vector object; and
the rendering circuit i) draws the specified vector object based on the print data, ii) draws the specified image object on the specified vector object based on the print data, and iii) performs a complementing process to the part corresponding to the specified vector object in the specified image object from a peripheral area based on the shape of the specified vector object indicated on which the specified image object overlaps by the overlapping information of the print data to enhance the resolution of the part.

6. A non-transitory computer-readable recording medium storing a rendering program executed by an image forming apparatus that prints an image constituted of a plurality of objects, a part of the objects overlapping one another, the rendering program causing the image forming apparatus to function as a rendering circuit for executing rendering of the image based on print data of the image, wherein:
the print data includes at least one object included in the image,
an image object that indicates a state where the objects are overlapped in the image, and overlapping information indicating which image object overlaps on which object, the image object having a reduced resolution at least partially compared with an actual resolution of the image, and
when processing the image object, the rendering circuit enhances the resolution of a part corresponding to the object in the image object based on a shape of the object overlapped at upper side in the image object indicated by the overlapping information, and wherein:
if a specified image object of the print data indicates a state where a specified vector object is overlapping a specified raster object in the image, the specified image object is a raster object generated in a state where the resolution of a part that the specified vector object is overlapping the specified raster object is made lower than the actual resolution of the image, and the print data indicates that the specified image object overlaps the specified vector object; and the rendering circuit i) draws the specified vector object based on the print data, ii) draws the specified image object on the specified vector object based on the print data, and iii) performs a complementing process to the part corresponding to the specified vector object in the specified image object from a peripheral area based on the shape of the specified vector object indicated on which the specified image object overlaps by the overlapping information of the print data to enhance the resolution of the part.

* * * * *